(12) United States Patent
Scheer et al.

(10) Patent No.: US 12,298,770 B2
(45) Date of Patent: May 13, 2025

(54) CONSIGNMENT DROP-OFF AT MOBILE TRANSPORT UNITS

(71) Applicants: Anja Scheer, Königswinter (DE); Christoph Dautz, Bonn (DE); Lutz Fischer, Bonn (DE)

(72) Inventors: Anja Scheer, Königswinter (DE); Christoph Dautz, Bonn (DE); Lutz Fischer, Bonn (DE)

(73) Assignee: Deutsche Post AG, Bonn (DE)

( * ) Notice: Subject to any disclaimer, the term of this patent is extended or adjusted under 35 U.S.C. 154(b) by 701 days.

(21) Appl. No.: 16/514,663

(22) Filed: Jul. 17, 2019

(65) Prior Publication Data

US 2021/0018922 A1 Jan. 21, 2021

Related U.S. Application Data

(63) Continuation of application No. PCT/EP2019/069120, filed on Jul. 16, 2019.

(51) Int. Cl.
*G06F 7/00* (2006.01)
*B65G 1/137* (2006.01)
*G05D 1/00* (2006.01)
*G06Q 10/0836* (2023.01)

(52) U.S. Cl.
CPC ......... *G05D 1/0212* (2013.01); *B65G 1/1371* (2013.01); *G06Q 10/0836* (2013.01)

(58) Field of Classification Search
CPC .............. G05B 1/04; G05B 19/4189; G05B 2219/31006; B65G 1/137; B65G 2207/40; B65G 2203/044; B65G 2203/0208; B65G 1/0407; B65G 1/0492; B65G 35/00; B65G 1/0421; B65G 2201/02; Y02P 90/02; B66F 9/07
USPC .......................................... 700/213–216, 228
See application file for complete search history.

(56) References Cited

U.S. PATENT DOCUMENTS

| 10,308,430 | B1 * | 6/2019 | Brady | G05D 1/0022 |
| 10,387,825 | B1 * | 8/2019 | Canavor | H04W 4/02 |
| 10,395,290 | B1 * | 8/2019 | Koo | G06Q 30/015 |
| 10,402,774 | B1 * | 9/2019 | Phillips | G06Q 10/0833 |

(Continued)

FOREIGN PATENT DOCUMENTS

| CN | 207718427 U | 8/2018 |
| JP | 2005343584 A | 12/2005 |

*Primary Examiner* — Yolanda R Cumbess
(74) *Attorney, Agent, or Firm* — Reinhart Boerner Van Deuren P.C.

(57) ABSTRACT

A method performed at a mobile transport unit is disclosed. In the method, parameters are determined by using sensors of the transport unit. The parameters include characteristics of the transport unit and/or characteristics of a consignment transported by the transport unit. In the method, the parameters are transmitted to a routing system, which determines a transport route for the transport unit, a need that waypoints/timing of an existing transport route of the transport unit has to be changed to obtain a changed transport route, or a need for a specific handling of the consignment. In the method, an instruction is received that is a routing instruction from the routing system pertaining to the determined transport route for the transport unit, to a transfer of the consignment from the transport unit to another transport unit, or to how the consignment shall be handled by the transport unit.

45 Claims, 5 Drawing Sheets

(56) References Cited

U.S. PATENT DOCUMENTS

| | | | |
|---|---|---|---|
| 10,514,690 B1* | 12/2019 | Siegel | G05D 1/0027 |
| 10,613,533 B1* | 4/2020 | Payson | G05D 1/0088 |
| 11,144,057 B1* | 10/2021 | Ebrahimi Afrouzi | G05D 1/0274 |
| 11,263,579 B1* | 3/2022 | Siegel | G06Q 10/0832 |
| 2014/0136414 A1 | 5/2014 | Abhyanker | |
| 2015/0269520 A1* | 9/2015 | Knapp | G06Q 10/08355 705/338 |
| 2016/0232479 A1* | 8/2016 | Skaaksrud | H04W 4/029 |
| 2017/0061368 A1* | 3/2017 | Qin | G06Q 10/0832 |
| 2018/0024554 A1* | 1/2018 | Brady | G06Q 10/0833 701/23 |
| 2018/0341911 A1* | 11/2018 | Daoura | G06Q 10/0833 |
| 2019/0035044 A1* | 1/2019 | Ferguson | G05D 1/0231 |
| 2019/0180236 A1* | 6/2019 | Greenberger | G05D 1/0291 |
| 2019/0197904 A1* | 6/2019 | Muta | G06Q 50/28 |
| 2019/0228375 A1* | 7/2019 | Laury | G05D 1/0088 |

* cited by examiner

CONSIGNMENT DROP-OFF AT MOBILE TRANSPORT UNITS

CROSS-REFERENCE TO RELATED PATENT APPLICATION

This patent application is a continuation of PCT/EP2019/069120, filed Jul. 16, 2019, the entire teachings and disclosure of which are incorporated herein by reference thereto.

FIELD OF THE DISCLOSURE

The invention relates to the field of mobile transport units, for example to methods, apparatuses, systems and computer programs allowing that consignments are stored and/or transported by mobile transport units according to sensed characteristics of the consignments.

BACKGROUND

It is known in the art that consignments such as parcels or other to-be-transported goods, instead of directly being delivered by a delivery entity to the recipient, can also be delivered into parcel lockers (like the "Packstation" of the Applicant) that are fixedly installed e.g. at public places and then are retrieved from these parcel lockers by the recipients at a time that is convenient for the recipients (so-called "last-mile"). It is also known that such parcel lockers can be used by senders to drop off their consignments (so-called "first-mile"). The consignments are then retrieved from the parcel locker by a delivery entity and are delivered to the recipient specified on the consignment. In this use case, the parcel locker replaces a usually human-serviced consignment acceptance point.

SUMMARY OF SOME EXAMPLE EMBODIMENTS OF THE INVENTION

Conventional parcel lockers, while being widely accepted and increasingly used, have a couple of drawbacks. For example, the parcel locker is not aware of the characteristics of the consignment that has been dropped off. It is for instance not known to the parcel locker if the consignment shall be urgently delivered or needs to be kept within a certain temperature range. Even if such characteristics of the consignment would be known to the parcel locker, conventional parcel lockers have only limited flexibility to react to such characteristics. For instance, since consignments dropped off at conventional parcel lockers are usually only collected from the parcel lockers once a day at a fixed time instant, there is no possibility to speed up collection of an urgent consignment. Furthermore, there usually exists no possibility in conventional parcel lockers to guarantee a certain temperature range for a consignment, individually.

As a further drawback, conventional parcel lockers are fixedly installed at locations that are chosen to be easily accessible by many persons that are potential senders (first-mile) or recipients (last-mile) of consignments. For at least some persons that do not live or work close to these locations, the way to the nearest parcel locker may become quite long. In some cases, a person e.g. wanting to drop off a consignment at a parcel locker and undertaking such a long way to reach the nearest parcel locker may find itself in a situation where the parcel locker has no capacity left so that the consignment cannot be dropped off.

From a perspective of a delivery company that deploys the parcel lockers, it has also to be considered that human personnel is required to load the last-mile consignments into the respective parcel lockers and to retrieve the first-mile consignments from the parcel lockers. The personnel has to load the consignments actually twice, in the case of last-mile consignments once into the delivery vehicle that is used to drive to the parcel lockers, and then into the parcel lockers, and in case of first-mile consignments, once from the parcel locker into the delivery vehicle and then, in the delivery hub, out of the delivery vehicle.

It is inter alia an object of the invention to improve this situation.

According to a first exemplary aspect of the invention, a method performed using a mobile transport unit is disclosed, the method comprising:
  determining, using one or more sensors of the mobile transport unit, one or more characteristics of the mobile transport unit or of a part thereof, wherein the one or more characteristics of the mobile transport unit or of a part thereof comprise an energy status, and one or more characteristics of a consignment that is to be transported or at least temporarily stored by the mobile transport unit;
  transmitting, by the mobile transport unit, the one or more characteristics to a routing system to enable the routing system to determine, at least based on the one or more characteristics, one or more of:
    a transport route for the mobile transport unit or for another mobile transport unit;
    one or more waypoints and/or a timing of an existing transport route of the mobile transport unit or of another mobile transport unit need to be changed to obtain a changed transport route;
    a specific handling need of the consignment at the mobile transport unit;
  receiving an instruction that is one or more of:
    a routing instruction from the routing system, the routing instruction pertaining to the determined transport route for the mobile transport unit or the changed transport route of the mobile transport unit;
    a transfer-related instruction related to a transfer of the consignment from the mobile transport unit to the other mobile transport unit;
    a handling instruction from the routing system related to how the consignment shall be handled by the mobile transport unit;
  processing the instruction.

The method according to the first aspect of the invention may for instance be performed by an apparatus or by a system that comprises a plurality of apparatuses. The apparatus or system may for instance form a part of the mobile transport unit.

According to a second exemplary aspect of the invention, a method performed by a routing system is disclosed, the method comprising:
  receiving, determined by a mobile transport unit by using one or more sensors of the mobile transport unit, one or more characteristics of a consignment that is to be transported or at least temporarily stored by the mobile transport unit and one or more characteristics of the mobile transport unit or of a part thereof, wherein the one or more characteristics of the mobile transport unit or of a part thereof comprise an energy status;
  determining, at least based on the one or more characteristics, one or more of:
    a transport route for the mobile transport unit or for another mobile transport unit, one or more waypoints and/or a timing of an existing transport route of the mobile transport unit or of another mobile transport unit has to be changed to obtain a changed transport route;
a specific handling need of the consignment at the mobile transport unit;
transmitting an instruction that is one or more of:
a routing instruction, which is transmitted to the mobile transport unit and pertains to the determined transport route for the mobile transport unit or the changed transport route of the mobile transport unit,
a routing instruction, which is transmitted to the other mobile transport unit and pertains to the determined transport route of the other mobile transport unit,
a handling instruction, transmitted to the mobile transport unit and related to how the consignment shall be handled by the mobile transport unit;
a transfer-related instruction, which is transmitted to the mobile transport unit and relates to a transfer of the consignment from the mobile transport unit to the other mobile transport unit.

The method according to the second aspect of the invention may for instance be performed by an apparatus or by a system that comprises a plurality of apparatuses. The apparatus or system may for instance form a part of the routing system.

For all aspects of the invention presented above (referred to as the "respective aspect" below), the following is disclosed:

A computer program according to the respective aspect of the invention, the computer program when executed by a processor causing an apparatus or system to perform or control the method according to the respective aspect of the invention.

A computer readable storage medium according to the respective aspect of the invention, in which the computer program according to the respective aspect of the invention is stored. The computer readable storage medium could for example be a disk or a memory or the like. It may, for example, be tangible and/or non-transitory. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An apparatus according to the respective aspect of the invention, which is configured to perform or comprises respective means for performing or controlling the method according to the respective aspect of the invention. The means of the apparatus can be implemented in hardware and/or software. They may comprise at least one processor for executing computer program code for performing the required functions, at least one memory storing the program code, or both. Alternatively, they could comprise circuitry that is designed to implement the required functions, for instance implemented in a chipset or a chip, like an integrated circuit. In general, the means may comprise for instance one or more processing means.

An apparatus or system according to the respective aspect of the invention, comprising at least one processor and at least one memory including computer program code, the at least one memory and the computer program code configured to, with the at least one processor, cause an apparatus or system (e.g. the apparatus or system according to the respective aspect of the invention) at least to perform or control the method according to the respective aspect of the invention.

A system according to the respective aspect of the invention, the system comprising a plurality of apparatuses and configured to perform or comprises respective means for performing or controlling the method according to the respective aspect of the invention.

The disclosed apparatus according to any aspect of the invention may be a module or a component for a device, for example a chip. Alternatively, the disclosed apparatus according to any aspect of the invention may be a device, for instance a server or other electronic device. The disclosed apparatus according to any aspect of the invention may comprise only the disclosed components (e.g. means) or may further comprise one or more additional components.

Furthermore, according to a third aspect of the invention, a system is disclosed, the system comprising an apparatus or system according to the first aspect of the invention and an apparatus or system according to the second aspect of the invention.

One or more of the features and/or embodiments disclosed in the following may further define the first and/or second aspect of the invention.

The mobile transport unit may for instance comprise a motor configured to move the mobile transport unit. The mobile transport unit may for instance be a vehicle (e.g. a car, truck, boat, aircraft, etc.). That is an autonomous driving vehicle that is for instance configured to follow a prescribed transport route (e.g. by processing routing instructions pertaining to the transport route). Alternatively, the mobile transport unit may for instance be a vehicle driven by a person, wherein for instance the person steers the vehicle according to a prescribed transport route (e.g. by observing routing instructions pertaining to the transport route and being for instance presented to the person in audible and/or visual form). Two or more mobile transport units may for instance form a platoon that moves as one unit. To this end, the two or more mobile transport units may for instance be coupled, e.g. via mechanical, magnetic and/or electro-magnetic coupling means. Once coupled, for instance only one of the mobile transport units may use power to move the platoon and/or may be responsible for navigating the transport route.

The mobile transport unit may for instance at least comprise one lockable compartment to receive one or more consignments. For instance, the mobile transport unit may comprise a plurality of respectively lockable compartments, for instance arranged in a matrix of compartments. At least some of the compartments may for instance be configured to receive one consignment at a time. Access to a consignment stored in a compartment may for instance require proof of authorization towards the transport unit by an entity that desires access to the consignment, for instance by presenting a code or biometric feature to the transport unit. The mobile transport unit may be configured to exchange at least one consignment with another mobile transport unit. For instance, both mobile transport units may be configured with (closable) openings that can be brought into close proximity to allow a consignment to be output by a mobile transport unit and received by the other mobile transport unit. Alternatively, only one of the transport units may comprise a (closable) opening via which a consignment can be output and then taken over by the other transport unit (e.g. a drone), e.g. by gripping it by a gripping device of the other transport unit.

The one or more sensors of the mobile transport unit may for instance be configured to determine one or more characteristics of the mobile transport unit or of a part thereof. For instance, a loading status of the mobile transport unit, or a loading status of each compartment of a plurality of compartments of the mobile transport unit may be determined, for instance by a respective sensor (e.g. a weight sensor, a light sensor or a contact-based sensor) in each compartment of the plurality of compartments of the mobile transport unit. As another example, a current temperature within the mobile transport unit, for instance in one or more of its compartments, may be determined by one or more sensors (e.g. by a respective temperature sensor in each compartment of a plurality of compartments of the mobile transport unit). Equally well, a current energy status of the mobile transport unit (e.g. a current battery or fuel level) may be determined by one or more sensors. One or more of the one or more sensors may equally well be configured to determine one or more characteristics related to an environment of the mobile transport unit, e.g. if another mobile transport unit is approaching the mobile transport unit, etc.

Furthermore, one or more sensors of the mobile transport unit may be configured to determine one or more characteristics of a consignment that is to be transported or at least temporarily stored by the mobile transport unit. These characteristics may for instance be determined with one or more optical sensors. For instance, a label of the consignment may be optically sensed to determine shipping information as a characteristic of the consignment, e.g. sender information (including the sender address) and/or recipient information (including the recipient address) and/or delivery-related information (e.g. priority information e.g. indicating whether the consignment shall be delivered with higher or lower priority; delivery-due information e.g. indicating when the consignment shall be preferably delivered to the recipient or when the consignment shall be delivered to the recipient at the latest; storing information e.g. pertaining to a temperature, humidity and/or environmental gas/air composition required by the consignment; and/or fragility information e.g. indicating if the consignment is fragile or otherwise susceptible to damage if not handled with caution). A weight sensor (e.g. a scale, e.g. included into the respective compartment in which the consignment is stored) may determine a weight of the consignment as another characteristic. Further examples of sensors are sensors for determining a size or volume of a consignment (e.g. an optical 3D-scanner).

The one or more sensors for determining one or more characteristics may for instance be at least partially (e.g. completely) included into the compartments of the transport unit (and then may for instance only determine one or more characteristics of the consignment that is entered into or contained in the compartment), or may be provided at a position in or at the mobile unit that allows to determine one or more characteristics of more than one consignment. For instance, the one or more sensors may be arranged in or at an opening of the mobile transport unit through which at least a couple of consignments are loaded into the mobile transport unit.

The one or more characteristics are transmitted to a routing system, which may for instance be implemented on one or more servers (e.g. a server farm). Transmission may take place via one or more communication network that may for instance comprise a mobile radio communication system and/or the Internet.

The deployment of one or more sensors at the mobile transport unit for determining the one or more characteristics and the transmission of the one or more characteristics to the routing system provides the routing system—for instance instantly after drop-off of the consignment at the mobile transport unit—with much more insight on the characteristics of the mobile transport unit and/or the consignment and allows the routing system to consider these one or more characteristics in a process of generating and/or updating transport routes for the mobile transport unit (and for instance also for further mobile transport units).

Based on the one or more characteristics, the routing system may for instance determine a transport route for the mobile transport unit. This may for instance be the case if no transport route existed for the mobile transport unit so far, e.g. because the mobile transport unit was deployed at a position (e.g. a public place) to wait for consignments to be dropped off. The transport route may for instance take into account that a consignment is of high priority and/or needs quick cooling in a hub station and/or needs cooling by the mobile transport unit that, given the current energy status of the mobile transport unit, requires the mobile transport unit to return to a hub station within a certain time. These considerations may for instance cause the transport route to directly (or after an adequately determined remaining waiting time) lead to the nearest hub station of a logistics company that deploys and controls the mobile transport unit so that the consignment can be further processed (e.g. cooled) there.

Based on the one or more characteristics, the routing system may for instance determine a transport route for another mobile transport unit. This may for instance be the case in a situation where it is decided that the mobile transport unit is not suited to transport the consignment (or e.g. store it for a longer time), for instance because other consignments in the mobile transport unit require a certain transport route that conflicts with the characteristics of the consignment (e.g. high priority or cooling requirements), or because the mobile transport unit cannot ensure proper handling of the consignment (e.g. since a required security level of the consignment cannot be guaranteed by the mobile transport unit and/or since the mobile transport unit cannot cool the consignment at all or cannot cool the consignment—in view of the mobile transport unit's energy status—for a long enough time, e.g. during transport of the consignment along the currently planned transport route of the mobile transport unit). It may then for instance be decided by the routing system that the consignment should be transported by the other mobile transport unit, and accordingly, a transport route for the other mobile transport unit allowing the consignment to be transferred from the mobile transport unit to the other mobile transport unit (either at a current location of the mobile transport unit or at a future location of the mobile transport unit). This transfer may take without human assistance (e.g. if both mobile transport units are autonomous driving vehicles) or with human assistance (e.g. if at least one of the mobile transport units is driven by a human).

Based on the one or more characteristics, the routing system may for instance determine a need that one or more waypoints and/or a timing of an existing transport route of the mobile transport unit has to be changed to obtain a changed transport route. This may for instance be the case in a situation where a transport route for the mobile transport route already exists (and the mobile transport unit then e.g. is currently located at one of the waypoints of the transport route), but where the characteristics of the mobile transport unit and/or of the consignment indicate that this existing transport route has to be modified to allow the consignment to be transported by the mobile transport route. For instance, to take a priority of the consignment into account, the stay times of the mobile transport routes at the waypoints of the existing transport route may be shortened to ensure that the mobile transport unit with the consignment returns to a hub station of a logistics company that deploys and controls the mobile transport unit and can then be adequately further processed there.

A transport route may be considered to comprise at least a sequence of one or more waypoints (geographic locations) and an associated timing, e.g. indicating when a waypoint is reached and when it is left. At a waypoint, a mobile transport unit may for instance rest for an amount of time defined by the transport route to allow consignments to be retrieved by recipients and/or to allow consignments to be dropped off by senders (or by deliverers).

Based on the one or more characteristics, the routing system may for instance determine a need that one or more waypoints and/or a timing of an existing transport route of another mobile transport unit has to be changed to obtain a changed transport route. This may for instance be the case in a situation where the routing system decides that the consignment, taken into account the characteristics of the mobile transport unit (e.g. loading status, current temperature and/or energy status) and/or of the consignment (e.g. priority and/or temperature requirement) is better transferred from the mobile transport unit to another mobile transport unit, wherein a transport route for the other mobile transport unit already exists and now has to be changed to consider the take-over of the consignment (and potentially also the return of the consignment to a hub station, if this is not already part of the existing transport route).

Based on the one or more characteristics, the routing system may for instance determine a need for a specific handling of the compartment. The handling may for instance comprise the way and/or the conditions under which the consignment is stored and/or released from the mobile transport unit. An example of a specific handling is cooling of the consignment at the mobile transport unit.

The determining performed by the routing system results in instructions that are transmitted to (and received at) the mobile transport unit or the other mobile transport unit so that they are processed at the mobile transport unit or the other mobile transport unit. Transmission of the instructions may take place via the same communication networks as are used for the transmission of the one or more characteristics, or at least partially via different networks.

One of the instructions may for instance be a routing instruction from the routing system, the routing instruction pertaining to the determined transport route for the mobile transport unit or the changed transport route of the mobile transport unit. The routing instruction may for instance comprise information on at least a part of the (e.g. the entire) determined transport route or at least a part of the (e.g. the entire) changed transport route. The routing instruction may for instance at least indicate to the mobile transport unit that a current position of the mobile transport unit shall be maintained or changed. The routing instruction may for instance enable the mobile transport unit to move at least to the next waypoint of the determined/changed transport route e.g. at a defined time instant or indicate to the mobile transport unit that no movement is necessary e.g. for a defined period of time.

One of the instructions may for instance be a transfer-related instruction related to a transfer of the consignment from the mobile transport unit to the other mobile transport unit. The transfer-related instruction may for instance inform the mobile transport unit that the consignment will be transferred to another mobile transport unit and/or may grant the mobile transport unit permission to perform this transfer once necessary or requested by the other mobile transport unit.

One of the instructions may for instance be a handling instruction from the routing system related to how the consignment shall be handled by the mobile transport unit. The handling may for instance pertain to keeping a temperature of the consignment below and/or above pre-defined or provided thresholds, and/or to enforcing a security level for the consignment. The handling instructions may for instance inform the mobile transport unit on the temperature threshold(s) to be kept for the consignment and/or the security level (e.g. single-factor authentication, two-factor authentication, etc.) to be enforced for the consignment.

In an embodiment of the first and/or second aspect of the invention, the consignment has been dropped off at the mobile transport unit by a sender of the consignment (and may thus represent a "first-mile consignment") or by a delivery entity that failed in delivering the consignment to a recipient directly (and may thus be considered a "not-at-home consignment"). For instance, dropping off of the consignment may not have been announced (e.g. by means of a reservation) to the routing system before the drop-off. Such types of dropped-off consignments consume storage capacity of the mobile transport unit as well as energy to be provided by the mobile transport unit e.g. when the consignments are transported and/or cooled, but cannot be properly forecasted by the routing system. Both the mobility of the mobile transport unit and the fact that characteristics of these types of dropped-off consignments as well as of the mobile transport unit can be sensed at the mobile transport unit and transmitted to the routing system contribute to adequate handling/delivering of these consignments and efficient, in particular energy-efficient use of the mobile transport unit.

In an embodiment of the first and/or second aspect of the invention, a current loading status, a current position, a currently planned transport route and/or other information on the mobile transport unit (e.g. if the mobile transport unit is able to cool and/or heat a consignment at all and/or for how long) is provided (e.g. by the mobile transport unit and/or by the routing system, or by another system) via a communication network to assist an entity with a decision on whether to drop off a consignment at the mobile transport unit or not. Such information may for instance be provided via an internet site for download or via an application installed on a computer or mobile device such as a mobile phone. The application may for instance allow searching for mobile transport units in a certain region and learning about their characteristics (such as loading status, cooling/heating capabilities, remaining time of stay at the current position, etc.).

In an embodiment of the first and/or second aspect of the invention, the routing system becomes aware of the consignment only when the consignment is dropped off at the mobile transport unit. The consignment may thus be a non-announced consignment for which no storage capacity at the mobile transport unit has been reserved so far.

In an embodiment of the first and/or second aspect of the invention, the mobile transport unit changes its position at least once a day. The mobile transport unit may, for instance in a hub station and/or at least once a day, be loaded with consignments (e.g. last-mile consignments) for retrieval by recipients. The mobile transport unit may then follow a transport route with one or more waypoints and respective associated stay times, to give the recipients the opportunity to retrieve their consignments from the mobile transport unit. At these waypoints, consignments (e.g. first-mile consignments) may be dropped off at the mobile transport unit as well e.g. by senders, given that capacity for storing/transporting these consignments is available. In an exemplary scenario, after the transport route is finished, all consignments (e.g. last-mile consignments) loaded into the mobile transport unit for retrieval by recipients have been collected, and the mobile transport unit only comprises the consignments (e.g. the first-mile consignments) that were dropped off at the mobile transport unit during the transport route. It is however also conceivable that the mobile transport unit leaves the hub station without any consignments and is only used for collecting (e.g. first-mile) consignments that are dropped off at the mobile transport unit by senders. These collected consignments are then further logistically processed once the mobile transport unit has returned them to the hub station at the end of its route.

The time that a mobile transport unit stays at a hub station to be loaded and/or unloaded represents a blocked period in which no dropping-off of consignments at the mobile transport unit is possible. This blocked period may for instance be announced to users of the mobile transport unit (e.g. via a website or smart phone app) and/or pre-defined.

In an embodiment of the first and/or second aspect of the invention, the mobile transport unit is an autonomous driving vehicle, and wherein processing the routing instruction comprises steering the mobile transport unit along at least a part of the determined transport route or of the changed transport route. The mobile transport unit is then for instance autonomous to the extent that a prescribed transport route can be followed without human assistance.

In an embodiment of the first and/or second aspect of the invention, the one or more characteristics of the mobile transport unit or of a part thereof comprise one or more of a loading status, an energy status, a temperature, a humidity, a characteristic of a gas or air contained in the mobile transport unit or in a part thereof.

In an embodiment of the first and/or second aspect of the invention, the mobile transport unit comprises a plurality of lockable compartments, and the loading status is representative of the occupancy of each of the plurality of lockable compartments. The loading status may for instance indicate how many compartments are occupied by consignments or free. If the compartments have different sizes, the loading status may for instance also comprise information on the respective size of the occupied or free compartment. The loading status may for instance represent how many compartments of each size or type are occupied or how many compartments of each size or type are free.

In an embodiment of the first and/or second aspect of the invention, the one or more characteristics of the consignment pertain to one or more of a weight, a size, a form, a type, a temperature, a temperature requirement, a humidity requirement, a requirement concerning the composition of a surrounding gas or air, a susceptibility to damage, a compression requirement, a security requirement, a delivery priority, a delivery time requirement, a sender information, a recipient information.

In an embodiment of the first and/or second aspect of the invention, the specific handling of the consignment at the mobile transport unit pertains to one or more storage conditions of the consignment at the mobile transport unit, and wherein the handling instruction is directed to controlling or affecting the one or more storage conditions. A storage condition may for instance be a temperature or another physical and/or chemical condition within a compartment.

In an embodiment of the first and/or second aspect of the invention, the specific handling of the consignment at the mobile transport unit pertains to security, and wherein the handling instruction is directed to setting a security level under which access to the consignment is possible. Examples of a security level may for instance be the type of authentication required, e.g. single-factor authentication or two-factor authentication.

In an embodiment of the first and/or second aspect of the invention, the routing instruction represents the determined transport route for the mobile transport unit, or a part thereof, or represents the changed transport route of the mobile transport unit, or a part thereof. The routing instruction is processed by the mobile transport unit, for instance by the mobile transport unit following the transport route, if the mobile transport unit is an autonomous driving vehicle, or by (e.g. visually and/or acoustically) presenting the routing instruction to a driver of the mobile transport unit to cause the driver to follow the transport route.

In an embodiment of the first and/or second aspect of the invention, the transfer-related instruction is received from the routing system and allows or instructs the mobile transport unit to transfer the consignment to the other mobile transport unit. The transfer-related instruction may for instance comprise authentication information based on which the mobile transport unit can check whether the transfer is authorized or not.

In an embodiment of the first and/or second aspect of the invention, the transfer-related instruction is received from the other mobile transport unit and requests or instructs the mobile transport unit to transfer the consignment to the other mobile transport unit. The transfer-related instruction may for instance comprise authentication information (e.g. a code, encrypted or signed information) based on which the mobile transport unit can check whether the transfer is authorized or not.

In an embodiment of the first and/or second aspect of the invention, the other mobile transport unit provides information to the mobile transport unit enabling the mobile transport unit to check that the other mobile transport unit is entitled to receive the consignment from the mobile transport unit. This information (e.g. authentication information or authorization information) may for instance stem from the routing system and may have been communicated to the other mobile transport unit to enable the other mobile transport unit to provide the information to the mobile transport unit.

In an embodiment of the first and/or second aspect of the invention, the other mobile transport unit is an airworthy mobile transport unit, for example a drone. Such another mobile transport unit may for instance be particularly suited to selectively collect single consignments from one or more mobile transport units that have been considered unsuited to store and/or transport the consignments after their dropping off at the mobile transport units, and to return these consignments to a hub station for further logistical processing in a quick manner.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Example embodiments of the invention pertain to a mobile transport unit and a routing system that provides routing instructions, consignment handling instructions and/or consignment transfer-related instructions to the mobile transport unit in response to characteristics determined by the mobile transport unit with sensors and pertaining to characteristics of the mobile transport unit and/or of a consignment to be stored and/or transported by the mobile transport unit. The invention allows for a flexible delivery process for consignments taking their characteristics such as delivery priority or temperature requirements into account and allows for an efficient use of one or more mobile transport units.

Figure 1:
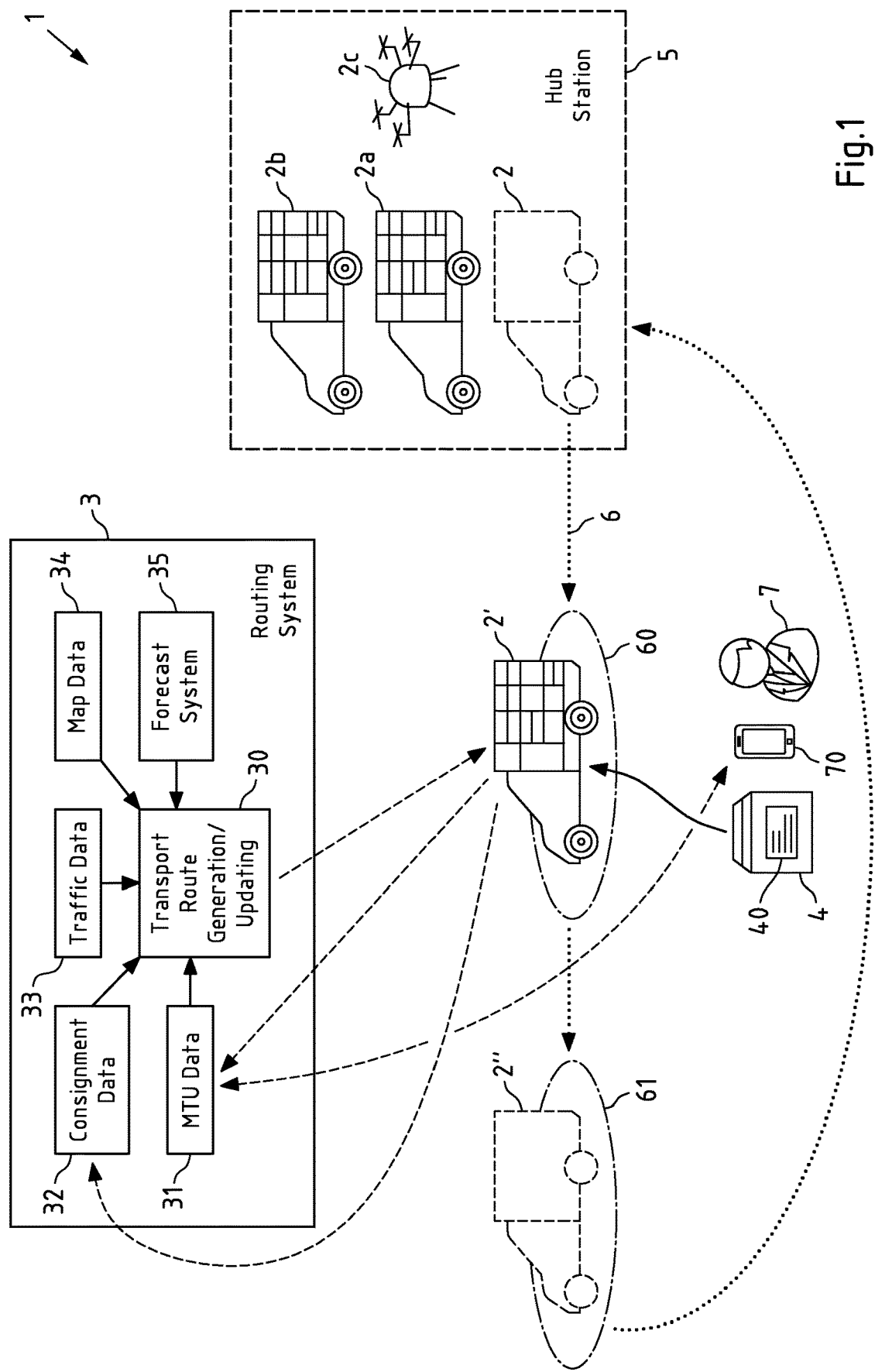
FIG. 1 shows a schematic illustration of an example embodiment of a system according to the third aspect of the invention, comprising an apparatus according to the first aspect of the invention and an apparatus according to the second aspect of the invention.

FIG. 1 is a schematic illustration of an example embodiment of a logistics system 1 according to the third aspect of the invention, comprising a mobile transport unit 2 according to the first aspect of the invention and a routing system 3 according to the second aspect of the invention. Communication paths are indicated as dashed arrows in FIG. 1.

In the logistics system 1 of FIG. 1, a plurality of mobile transport units 2, 2a, 2b and 2c are illustrated as being based in a hub station 5 of a logistics company. The logistics company may for instance deploy such hub stations 5 across a delivery region according to capacity needs. The hub stations 5 may for instance be logistically connected to larger logistics centres. The mobile transport units may for instance be vehicles, for example unmanned autonomous driving vehicles. In FIG. 1, mobile transport units 2, 2a and 2b are trucks, whereas mobile transport unit 2c is a drone.

The mobile transport units are configured to follow a transport route that is generated and—if needed—updated by transport route generation/updating unit 30 of routing system 3. For mobile transport unit 2, this transport route is indicated with reference numeral 6 in FIG. 1. The transport route 6 shown in FIG. 1 exemplarily starts and ends at hub station 5, but that is not a must, it may for instance equally end at another hub station. Transport route 6 comprises one or more waypoints, of which two waypoints 60 and 61 are exemplarily shown. Mobile transport unit 2, when following transport route 6, will arrive at waypoints 60 and 61 and stay for respective time periods that are also part of transport route 6. In FIG. 1, the mobile transport unit, when residing at waypoint 60, is denoted with reference numeral 2', and when residing at waypoint 61, is denoted with reference numeral 2". At waypoint 60, a user 7 can drop off a consignment 4 (e.g. a parcel) bearing a label 40 at mobile transport unit 2', e.g. by interacting with the mobile transport unit's user interface and inserting consignment 4 into a compartment of mobile transport unit 2'. User 7 may for instance have learned that mobile transport unit 2' will be at the address of waypoint 60 at a specific time by using an (e.g. mobile) electronic device 70 to communicate (e.g. via a website or an application) with routing system 3, such as with its Mobile Transport Unit (MTU) data unit 31 (or at least a "public" portion thereof). User 7 may for instance be a sender of a first-mile consignment, or a deliverer of the logistic company who failed to deliver a consignment to its recipient and uses mobile transport unit 2' as a fall-back delivery option. The recipient of the consignment may for instance be informed that his consignment could not be delivered and was instead dropped off at mobile transport unit 2' for collection by the recipient.

Either when user 7 interacts with a user interface of mobile transport unit 2', or when the consignment 4 is placed into (e.g. a compartment of) mobile transport unit 2' or after the consignment 4 has been placed into (e.g. a compartment of) mobile transport unit 2', one or more characteristics of the consignment 4 are determined by one or more sensors of mobile transport unit 2'. For instance, delivery-related information may be read from the label 40 of the consignment 4. Examples of such delivery-related information have already been given above, e.g. a priority of delivery, a security level and/or a temperature requirement (e.g. a maximum temperature that the temperature of the consignment shall not exceed).

At the same time when the characteristics of the consignment 4 are determined, or before or after this instant, also characteristics of the mobile transport unit 2' may be determined by one or more sensors of the mobile transport unit 2'. Characteristics of the mobile transport unit 2' may for instance comprise a loading status and/or energy status and/or current temperature of the mobile transport unit 2'.

It should be noted that not necessarily characteristics of both the consignment 4 and the mobile transport unit 2' need to be determined, it may equally well be the case that only one or more characteristics of either the consignment 4 or the mobile transport unit 2' are determined. Characteristics of the mobile transport unit 2' may for instance be determined on a regular basis (or upon request from e.g. routing system 30), e.g. independent on whether a consignment is dropped of at mobile transport unit 2' or not.

The determined characteristics, or a subset thereof, are then transmitted to the routing system 3 via one or more communication systems (e.g. a mobile radio communication system, to which routing system 3 is functionally connected), for instance together with information allowing to identify mobile transport unit 2'. Therein, the characteristics of the mobile transport unit 2' end up in MTU data unit 31, while the characteristics of the consignment 4 end up in consignment data unit 32.

At least based on the new data in consignment data unit 32 and/or MTU data unit 31, the transport route generation/updating unit 30 of routing system 3 determines if this new data requires a reaction (e.g. a change or creation of a transport route). Further information to be considered in this determination may for instance be traffic data (e.g. on current road congestions) from traffic data unit 33, map data from map data unit 34 and forecast data from forecast unit 35, that e.g. attempts to forecast how many further consignments will be dropped off at transport unit 2' at waypoint 60 and/or along the rest of its transport route 6.

The consignment data unit 32 may also comprise information on one or more further consignments, e.g. consignments that are currently transported by mobile transport unit 2' and are expected to be at least partially be retrieved by their recipients in the course of transport route 6, and/or one or more consignments that have already been announced to be dropped off at mobile transport unit 2' at waypoint 60 or later waypoints of transport route 6, and/or on one or more consignments to be delivered that have not yet been assigned to a transport route at all, and/or one or more consignments that have been assigned to one or more other transport routes operated by one or more other transport units (like transport units 2a, 2b and 2c, for instance). This information of consignment data unit 32 may also be at least partially considered by transport route generation/updating unit 30 when determining if the new data in consignment data unit 32 and/or MTU data unit 31 requires a reaction. At least a part of the data stored in consignment data unit 32 may for instance have been provided by a central logistics system of a logistics company to routing system 3. For instance, the central logistics system may provide such data to a plurality of routing systems 3, wherein each routing system 3 of the plurality of routing systems may for instance have been associated with a different geographical delivery area.

Similarly, the MTU data unit 31 may also comprise information on one or more further mobile transport units (like transport units 2a, 2b and 2c, for instance, or on the entire fleet of mobile transport units of the logistics company), for instance on their characteristics such as for instance current loading status, current energy status and/or current temperature. This information of MTU data unit 32 may also be at least partially considered by transport route generation/updating unit 30 when determining if the new data in consignment data unit 32 and/or MTU data unit 31 requires a reaction.

Furthermore, when determining if the new data in consignment data unit 32 and/or MTU data unit 31 requires a reaction, transport route generation/updating unit 30 may further consider information on at least a part of respective transport routes of one or more further mobile transport units (like mobile transport units 2a, 2b and 2c, for instance).

It may also be the case that transport routes for vehicles that transport consignments (e.g. last-mile consignments) to stationary storage units where the consignments are loaded into compartments of the stationary storage units and can then be retrieved by recipients of the consignments can be determined by the transport route generation/updating unit 30.

As a result of the determining of the transport route generation/updating unit 30, one or more instructions are created and transmitted to the mobile transport unit 2' and/or to one or more other transport units (e.g. one or more of mobile transport units 2a, 2b and 2c, which may be manned or unmanned mobile transport units). These instructions may be routing instructions pertaining to new or changed transport routes for the mobile transport unit 2' or the other transport units, or handling instructions concerning handling of consignment 4 at mobile transport unit 2', or transfer-related instructions related to the transfer of consignment 4 from the mobile transport unit 2' to another mobile transport unit (e.g. one of mobile transport unit 2a, 2b or 2c).

The following scenarios may for instance take place after a first-mile consignment 4 has been dropped off at mobile transport unit 2' at waypoint 60:

I. It is determined by an optical sensor at mobile transport unit 2' from the label 40 of consignment 4 that consignment 4 shall not be exposed to temperatures larger than 20° C. It has further been determined with a sensor at mobile transport unit 2' that the mobile transport unit 2' currently only has 70% of its total energy (e.g. electric energy) left. Based on this temperature requirement and energy status, which are transmitted to the routing system 3, the transport route generation/updating unit 30 determines that there is not sufficient energy left at the mobile transport unit 2' to cool consignment 4 below 20° C. while also cooling the consignments, which were already contained in the mobile transport unit 2' before drop-off of consignment 4, during the entire transport route 6 originally planned for mobile transport unit 2'. Thus a transport route of another mobile transport unit with sufficient cooling capabilities is generated or changed to comprise e.g. waypoint 60 so that the other mobile transport unit can take over consignment 4 from mobile transport unit 2' at waypoint 60 (equally well, exchange may take place at another waypoint such as waypoint 61 at a time when mobile transport unit 2' has reached waypoint 61). Furthermore, a handling instruction is transmitted to mobile transport unit 2' to instruct mobile transport unit 2' to cool consignment 4 until the transfer takes place. Even further, transfer-related instructions (e.g. a joint secret such as a code) are transmitted to both mobile transport unit 2' and the other mobile transport unit to allow authentication of the other mobile transport unit towards the mobile transport unit 2' at the time of the transfer of consignment 4.

II. It is determined by an optical sensor at mobile transport unit 2' from the label 40 of consignment 4 that consignment 4 shall be delivered with highest priority (e.g. based on a service level represented by the label or based on a sender or recipient information represented by the label). This information is transmitted to routing system 3, where the transport route generation/updating unit 30 determines that the originally planned transport route 6 for mobile transport unit 2' takes 8 more hours until the mobile transport unit 2' returns to the hub station 5. It is thus decided by transport route generation/updating unit 30 that the consignment 4 shall be collected from mobile transport unit 2' by another mobile transport unit, in this exemplary case by mobile transport unit 2c which is a drone. For this drone, a new transport route is generated that leads the drone e.g. to waypoint 60, where the consignment 4 is transferred to the drone 2c. The drone 2c then returns to the hub station 5 with consignment 4, which can be further logistically processed there. This may take significantly less time than leaving consignment 4 in mobile transport unit 2' and waiting for mobile transport unit 2' to return to hub station 5 at the end of transport route 6.

III. It is determined by an optical sensor at mobile transport unit 2' from the label 40 of consignment 4 that consignment 4 shall be delivered with standard priority and needs no cooling. Based on this information, the transport route generation/updating unit 30 may actually decide that consignment 4 may remain in mobile transport unit 2' for the entire transport route 6 originally planned for mobile transport unit 2'. However, based on data from consignment data unit 32, transport route generation/updating unit 30 knows that, at the next waypoint 61, there will be a number of announced further drop-offs of consignments that will lead to the storage capacity of mobile transport unit 2' to be exceeded, which would lead to one or more of the announced drop-off consignments to be rejected by mobile transport unit 2'. To avoid this situation, transport route generation/updating unit 30 attempts to have consignment 4 be transferred from mobile transport unit 2' to another mobile transport unit for which an according new transport route is generated or an existing transport route is changed so that mobile transport unit 2' and the other mobile transport unit can meet to conduct the transfer. According transfer-related instructions are then for instance sent to both mobile transport units involved in the transfer to allow for authentication of the other mobile transport unit towards mobile transport unit 2'.

IV. It is determined by an optical sensor at mobile transport unit 2' from the label 40 of consignment 4 that consignment 4 shall be delivered with standard priority and needs no cooling. Based on this information and further information available to routing system 3, the transport route generation/updating unit 30 decides that consignment 4 may remain in mobile transport unit 2' for the entire transport route 6 originally planned for mobile transport unit 2'.

V. It is determined by an optical sensor at mobile transport unit 2' from the label 40 of consignment 4 that consignment 4 requires a high security level. Based on this information, the transport route generation/updating unit 30 determines that an according handling instruction shall be transmitted to mobile transport unit 2' to cause enforcement of a high security level for consignment 4. The handling instruction may for instance contain information based on which the high security level can be realized, such as code that has to be presented by a recipient of the consignment 4 when retrieving the consignment 4 from mobile transport unit 2', e.g. in addition to one or more other credentials or authentication factors that the recipient also has to present to retrieve the consignment 4.

As can be seen from the above example scenarios I-V, the consignment 4 can advantageously always be dropped off at mobile transport unit 2' without being rejected by the mobile transport unit 2'. For example with respect to example scenarios I-III, drop-off of consignment 4 at mobile transport unit 2' was not rejected although in the end, it turned out that mobile transport unit 2' was unsuited to transport consignment 4 to hub station 5. However, the deployment of several mobile transport units and the possibility to transfer consignments among them allowed to resolve the respective issues and have consignment 4 transported to hub station 5 under preservation of the requirements (temperature, priority) associated with the consignment 4 and without affecting dropping-off of announced consignments at subsequent waypoints of the originally planned transport route 6 of the mobile transport unit 2'.

Figure 2:
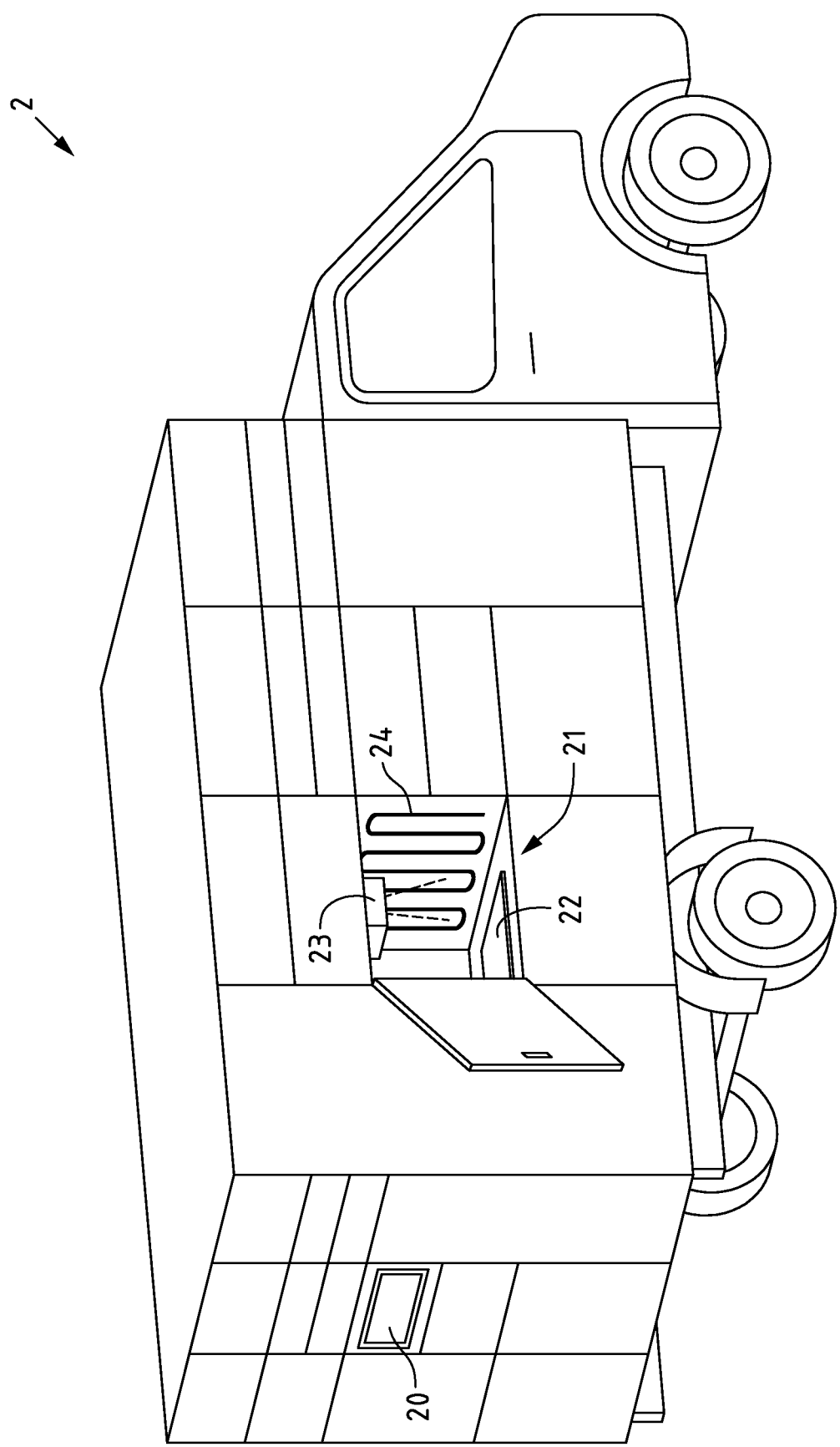
FIG. 2 shows a schematic illustration of a mobile transport unit as an example of an apparatus according to the first aspect of the invention.

FIG. 2 is a schematic illustration of a mobile transport unit 2 as an example of an apparatus according to the first aspect of the invention. Mobile transport unit 2 is exemplarily embodied as a truck, for example an autonomous driving, electrically powered truck. Mobile transport unit 2 is capable of following a transport route generated by the routing system 3.

Mobile transport unit 2 comprises a plurality of lockable compartments, of which one compartment is exemplarily furnished with reference sign 21. The compartments may be of the same size or of different sizes, e.g. to receive consignments of different sizes. Access to the compartments may for instance be controlled by a processor of mobile transport unit 2. For instance, the processor may open empty compartments without requiring an authorization by a user, but may open compartments containing a consignment only when one or more authentication factors (like e.g. a code and/or a biometric feature) are provided by a user. How many authentication factors are required may depend on a security level set of the consignment. For interaction with a user, mobile transport unit 2 comprises a user interface 20, which may for instance be embodied as a display and keyboard or a touchscreen.

Compartment 21 is box-shaped an can be opened and closed by means of a lockable door. Within compartment 21, different sensors are arranged. A weight sensor 22 may for instance determine a weight of a consignment placed into compartment 21. A sensor 23 may for instance determine information from a label of the consignment, for instance via bar code scanning and/or character recognition. Alternatively, if the label is of electromagnetic, electric or magnetic type, the information from the label may be read by sensor 23 based on electromagnetic signals, electric fields or magnetic fields. For instance, the label may be an Radio Frequency Identification (RFID) or Near Field Communication (NFC) label, and then, correspondingly, sensor 23 may be an RFID sensor or NFC sensor. Compartment 21 further comprises a cooling element 24, which allows to cool the interior of compartment 21. To determine the current temperature of the interior of compartment 21, a temperature sensor may be installed in compartment 21 (not shown in FIG. 2).

Mobile transport unit 2 may also be capable of transferring consignments stored in its compartments to another mobile transport unit (or to delivery personnel that manually retrieves the consignment from mobile transport unit). For instance, mobile transport unit may, in its interior, comprise a unit (e.g. a robotic arm) that can selectively access the compartments from behind (e.g. by opening the back wall of a respective compartment), retrieve the consignment and output or cause outputting of the consignment through an opening in a side wall or in the ceiling of mobile transport unit 2. In this way, transfer of consignments from the mobile transport unit to another mobile transport unit becomes possible even if one or both of the mobile transport units are unmanned.

Figure 3:
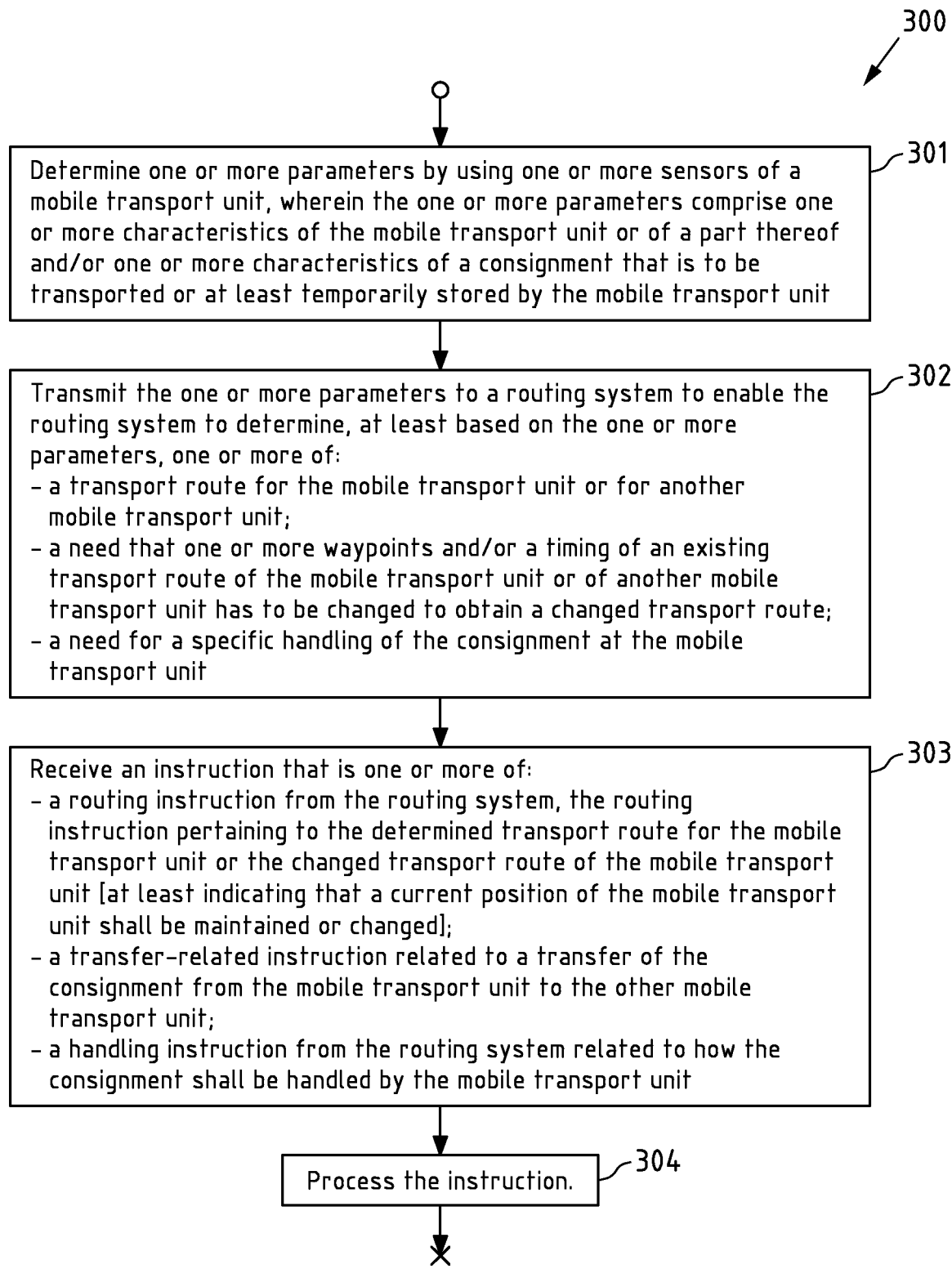
FIG. 3 shows a flowchart showing an example embodiment of a method according to the first aspect of the invention.

FIG. 3 is a flowchart showing an example embodiment of a method 300 according to the first aspect of the invention. The steps of flowchart 300 may for instance be executed by mobile transport unit 2/2'/2" of FIG. 1 or mobile transport unit 2 of FIG. 2, and/or by processor 501 of apparatus 500 of FIG. 5. In an (e.g. first) step 301, one or more characteristics are determined by using one or more sensors of a mobile transport unit, wherein the one or more characteristics are one or more characteristics of the mobile transport unit or of a part thereof and/or one or more characteristics of a consignment that is to be transported or at least temporarily stored by the mobile transport unit. In an (e.g. subsequent) step 302, the one or more characteristics are transmitted to a routing system to enable the routing system to determine, at least based on the one or more characteristics, one or more of: a transport route for the mobile transport unit or for another mobile transport unit; a need that one or more waypoints and/or a timing of an existing transport route of the mobile transport unit or of another mobile transport unit has to be changed to obtain a changed transport route; a need for a specific handling of the consignment at the mobile transport unit. In an (e.g. subsequent) step 303, an instruction is received that is one or more of: a routing instruction from the routing system, the routing instruction pertaining to the determined transport route for the mobile transport unit or the changed transport route of the mobile transport unit; a transfer-related instruction related to a transfer of the consignment from the mobile transport unit to the other mobile transport unit; a handling instruction from the routing system related to how the consignment shall be handled by the mobile transport unit. In an (e.g. subsequent) step 304, the instruction is processed.

Figure 4:
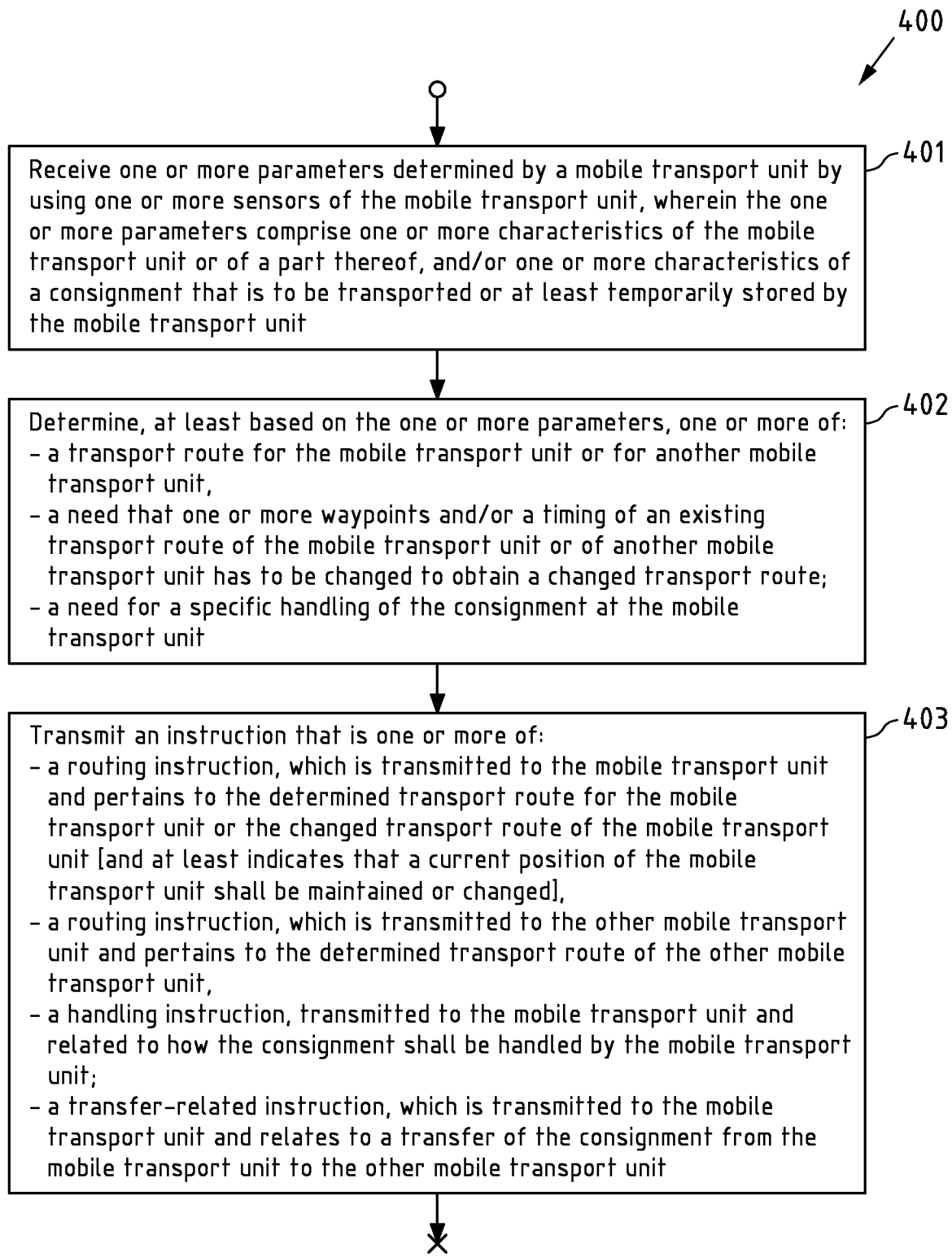
FIG. 4 shows a flowchart showing an example embodiment of a method according to the second aspect of the invention.

FIG. 4 is a flowchart showing an example embodiment of a method 400 according to the second aspect of the invention. The steps of flowchart 400 may for instance be executed by routing system 3 of FIG. 1, and/or by processor 601 of apparatus 600 of FIG. 6. In an (e.g. first) step 401, one or more characteristics determined by a mobile transport unit by using one or more sensors of the mobile transport unit are received, wherein the one or more characteristics comprise one or more characteristics of the mobile transport unit or of a part thereof, and/or one or more characteristics of a consignment that is to be transported or at least temporarily stored by the mobile transport unit. In an (e.g. subsequent) step 402, at least based on the one or more characteristics, one or more of the following is determined: a transport route for the mobile transport unit or for another mobile transport unit; a need that one or more waypoints and/or a timing of an existing transport route of the mobile transport unit or of another mobile transport unit has to be changed to obtain a changed transport route; a need for a specific handling of the consignment at the mobile transport unit. In an (e.g. subsequent) step 403, an instruction is transmitted that is one or more of: a routing instruction, which is transmitted to the mobile transport unit and pertains to the determined transport route for the mobile transport unit or the changed transport route of the mobile transport unit; a routing instruction, which is transmitted to the other mobile transport unit and pertains to the determined transport route of the other mobile transport unit; a handling instruction, transmitted to the mobile transport unit and related to how the consignment shall be handled by the mobile transport unit; a transfer-related instruction, which is transmitted to the mobile transport unit and relates to a transfer of the consignment from the mobile transport unit to the other mobile transport unit.

Figure 5:
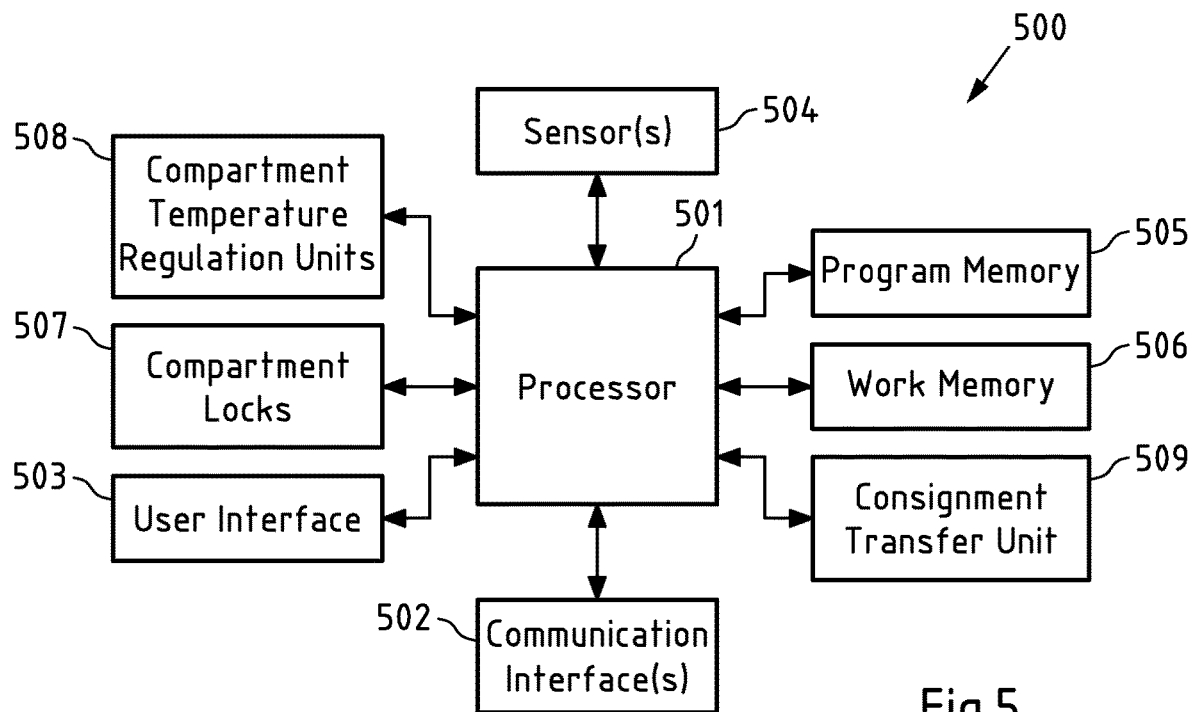
FIG. 5 shows a schematic block diagram of an apparatus according to the first aspect of the invention.

FIG. 5 a schematic block diagram of an apparatus 500 according to the first aspect of the invention, which may for instance represent or form part of mobile transport unit 2/2'/2" of FIG. 1 or mobile transport unit 2 of FIG. 2.

Apparatus 500 comprises a processor 501. Processor 501 may represent a single processor or two or more processors, which are for instance at least partially coupled, for instance via a bus. Processor 501 executes a program code stored in program memory 505. This program code may for instance cause apparatus 500 to perform any one of the example embodiments of the method according to the first aspect of the invention (see the flowchart of FIG. 3), when executed on processor 501. Processor 501 further interfaces with a work memory 506.

Some or all of memories 505 and 506 may also be included into processor 501. One of or both of memories 505 and 506 may be fixedly connected to processor 501 or at least partially removable from processor 501, for instance in the form of a memory card or stick. Program memory 505 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 505 may also comprise an operating system for processor 501. Program memory 505 may for instance comprise a first memory portion that is fixedly installed in apparatus 500, and a second memory portion that is removable from apparatus 500, for instance in the form of a removable SD memory card. Work memory 506 may for instance be a volatile memory. It may for instance be a RAM or DRAM memory, to give but a few non-limiting examples. It may for instance be used as a working memory for processor 501 when executing an operating system and/or programs.

Processor 501 further controls one or more communication interfaces 502 configured to receive and/or output information. For instance, communication interface 502 may be configured to receive information, for example instructions such as routing instructions, handling instructions and transfer-related instructions, from routing system 3 (see FIG. 1). Communication interface 502 may further be configured to transmit information to routing system 3, for example characteristics pertaining to characteristics of a mobile transport unit and/or or a consignment that is to be stored in and/or transported by a mobile transport unit. This communication may for instance at least partially be based on a wireless connection. Communication interface(s) 502 may thus for instance comprise circuitry such as modulators, filters, mixers, switches and/or one or more antennas to allow transmission and/or reception of signals. In embodiments of the invention, communication interface 502 is configured to allow communication according to a 2G/3G/4G/5G cellular communication network and/or a non-cellular communication network, such as for instance a WLAN network. Nevertheless, the communication route between mobile transport unit 2 and routing system 3 (see FIG. 1) may equally well at least partially comprise wire-bound portions. For instance, routing system 3 may be connected to a back-bone of a wireless communication network (that is used by mobile transport unit 2) via a wire-bound network such as for instance the internet. Communication interface 502 may for instance include a cellular modem. Communication interface 502 may also be configured to allow for communication with devices (e.g. smart phones and/or hand-held devices, e.g. of delivery personnel) of users of the mobile transport unit. Such communication may for instance serve the purpose of authenticating a user towards the mobile transport unit and/or to provide information to the users, e.g. on characteristics of the mobile transport unit and/or on a current transport route of the mobile transport unit, e.g. with information on currently planned waypoints for the mobile transport unit and associated respective dwell times of the mobile transport unit, and/or on block times where the mobile transport units cannot be used for dropping off consignments.

Processor 501 further controls a user interface 503 (that e.g. represents user interface 20 of FIG. 2) configured to present information to a user of apparatus 500 and/or to receive information from such a user (e.g. one or more authentication factors required to get access to a compartment).

Processor 501 further controls compartment locks 507, in order to individually control access to its compartments.

Processor 501 further controls compartment temperature regulation (e.g. cooling and/or heating) units 508, e.g. under consideration of handling instructions received from routing system 3 and/or on a current compartment temperature sensed by one of sensors 504.

Processor 501 further controls a consignment transfer unit 509 (e.g. a robotic arm), in order to enable transfer of a consignment from a compartment of apparatus 500 to another mobile transport unit.

The components 502-509 of apparatus 500 may for instance be connected with processor 501 by means of one or more serial and/or parallel busses.

Figure 6:
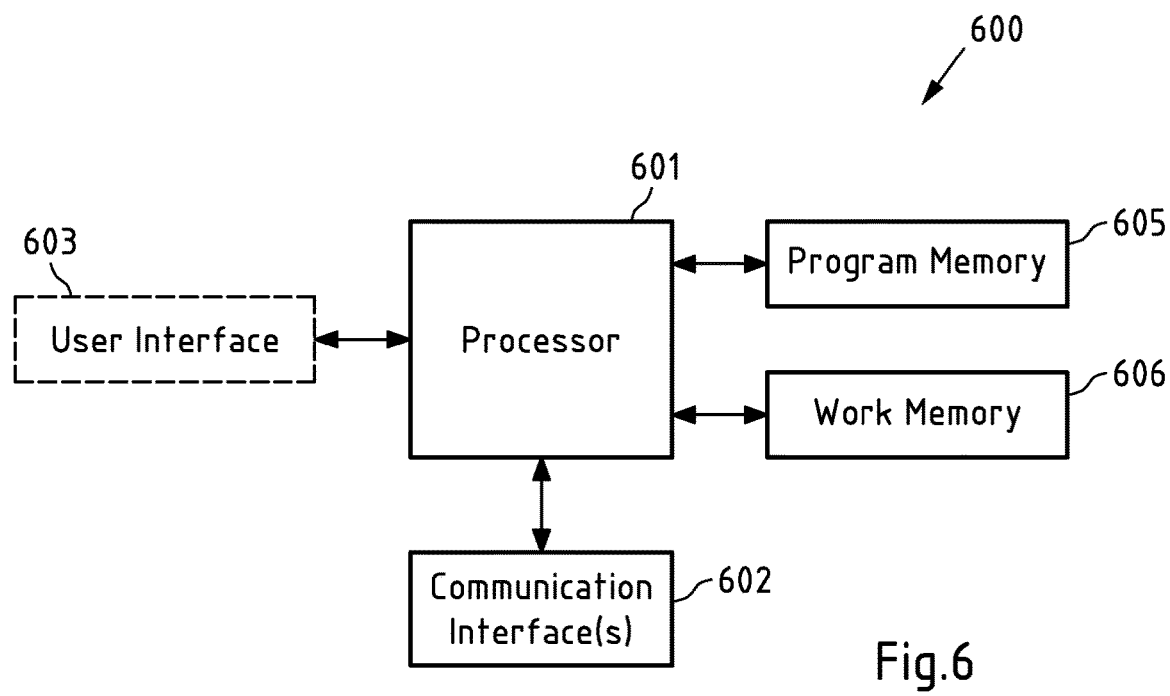
FIG. 6 shows a schematic block diagram of an apparatus according to the second aspect of the invention.

FIG. 6 a schematic block diagram of an apparatus 600 according to the second aspect of the invention, which may for instance represent or form part of routing system 3 of FIG. 1. Apparatus 600 may represent or form part of transport route generation/updating unit 30 of routing system 3 of FIG. 1.

Apparatus 600 comprises a processor 601. Processor 601 may represent a single processor or two or more processors, which are for instance at least partially coupled, for instance via a bus. Processor 601 executes a program code stored in program memory 605. This program code may for instance cause apparatus 600 to perform any one of the example embodiments of the method according to the second aspect of the invention (see the flowchart of FIG. 4), when executed on processor 601. Processor 601 further interfaces with a work memory 606.

Some or all of memories 605 and 606 may also be included into processor 601. One of or both of memories 605 and 606 may be fixedly connected to processor 601 or at least partially removable from processor 601, for instance in the form of a memory card or stick. Program memory 605 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 605 may also comprise an operating system for processor 601. Program memory 605 may for instance comprise a first memory portion that is fixedly installed in apparatus 600, and a second memory portion that is removable from apparatus 600, for instance in the form of a removable SD memory card. Work memory 606 may for instance be a volatile memory. It may for instance be a RAM or DRAM memory, to give but a few non-limiting examples. It may for instance be used as a working memory for processor 601 when executing an operating system and/or programs.

Processor 601 further controls one or more communication interfaces 602 configured to receive and/or output information. For instance, communication interface 602 may be configured to receive information, for example characteristics of a mobile transport unit 2 (see FIG. 1) or characteristics of a consignment that is to be transported or at least temporarily stored by the mobile transport unit, from a mobile transport unit. Communication interface 602 may further be configured to transmit information to a mobile transport unit, for example instructions for a mobile transport unit (for example instructions such as routing instructions, handling instructions and transfer-related instructions). This communication may for instance at least partially be based on a wireless connection. Communication interface(s) 602 may thus for instance comprise circuitry such as modulators, filters, mixers, switches and/or one or more antennas to allow transmission and/or reception of signals. In embodiments of the invention, communication interface 602 is configured to allow communication according to a 2G/3G/4G/5G cellular communication network and/or a non-cellular communication network, such as for instance a WLAN network. Nevertheless, the communication route between mobile transport unit 2 and routing system 3 (see FIG. 1) may equally well at least partially comprise wire-bound portions. For instance, routing system 3 may be connected to a back-bone of a wireless communication network (that is used by mobile transport unit 2) via a wire-bound network such as for instance the internet.

If apparatus 600 represents the transport route generation/updating unit 30 of routing system 3 of FIG. 1, communication interfaces 602 may further be configured to allow processor 601 to exchange (e.g. receive) information from consignment data unit 32, MTU data unit 31, traffic data unit 33, map data unit 34 and forecast system 35. At least some data (e.g. characteristics of the mobile transport unit and/or of the consignment to be transported or at least temporarily stored in the mobile transport unit) may then for instance be stored in and retrieved from consignment data unit 32 and MTU data unit 31 via apparatus 600.

As already described above, information such as a current loading status, a current position, a currently planned transport route and/or other information of a mobile transport unit (e.g. if the mobile transport unit is able to cool and/or heat a consignment at all and/or for how long) may be provided via a communication network to assist an entity with a decision on whether to drop off a consignment at the mobile transport unit or not. Such information may for instance be provided via communication interfaces 602 of apparatus 600. For instance, such information may be provided via an internet site for download or via an application installed on a computer or mobile device such as a mobile phone, e.g. in the form of push messages.

Processor 601 may further control an optional user interface 603 allowing for interaction with processor 601, e.g. for monitoring and/or maintenance purposes.

The components 602, 603, 605 and 606 of apparatus 600 may for instance be connected with processor 601 by means of one or more serial and/or parallel busses.

In the specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. The example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The following example embodiments of the invention are also disclosed:

Embodiment 1

A method performed at a mobile transport unit, the method comprising:
determining, by using one or more sensors of the mobile transport unit, one or more characteristics of the mobile transport unit or of a part thereof and/or one or more characteristics of a consignment that is to be transported or at least temporarily stored by the mobile transport unit;
transmitting the one or more characteristics to a routing system to enable the routing system to determine, at least based on the one or more characteristics, one or more of:
a transport route for the mobile transport unit or for another mobile transport unit;
a need that one or more waypoints and/or a timing of an existing transport route of the mobile transport unit or of another mobile transport unit has to be changed to obtain a changed transport route;
a need for a specific handling of the consignment at the mobile transport unit;
receiving an instruction that is one or more of:
a routing instruction from the routing system, the routing instruction pertaining to the determined transport route for the mobile transport unit or the changed transport route of the mobile transport unit;
a transfer-related instruction related to a transfer of the consignment from the mobile transport unit to the other mobile transport unit;
a handling instruction from the routing system related to how the consignment shall be handled by the mobile transport unit;
processing the instruction.

Embodiment 2

A method performed at a routing system, the method comprising:
receiving one or more characteristics determined by a mobile transport unit by using one or more sensors of the mobile transport unit, wherein the one or more characteristics comprise one or more characteristics of the mobile transport unit or of a part thereof, and/or one or more characteristics of a consignment that is to be transported or at least temporarily stored by the mobile transport unit;
determining, at least based on the one or more characteristics, one or more of:
a transport route for the mobile transport unit or for another mobile transport unit,
one or more waypoints and/or a timing of an existing transport route of the mobile transport unit or of another mobile transport unit need to be changed to obtain a changed transport route;
a specific handling need of the consignment at the mobile transport unit;
transmitting an instruction that is one or more of:
a routing instruction, which is transmitted to the mobile transport unit and pertains to the determined transport route for the mobile transport unit or the changed transport route of the mobile transport unit,
a routing instruction, which is transmitted to the other mobile transport unit and pertains to the determined transport route of the other mobile transport unit,
a handling instruction, transmitted to the mobile transport unit and related to how the consignment shall be handled by the mobile transport unit;
a transfer-related instruction, which is transmitted to the mobile transport unit and relates to a transfer of the consignment from the mobile transport unit to the other mobile transport unit.

Embodiment 3

The method according to any of the preceding embodiments, wherein the consignment has been dropped off at the mobile transport unit by a sender of the consignment or by a delivery entity that failed in delivering the consignment to a recipient directly.

Embodiment 4

The method according to any of the preceding embodiments, wherein a current loading status, a current position, a currently planned transport route and/or other information on the mobile transport unit are provided via a communication network to assist an entity with a decision on whether to drop off a consignment at the mobile transport unit or not.

Embodiment 5

The method according to any of the preceding embodiments, wherein the routing system becomes aware of the consignment only when the consignment is dropped off at the mobile transport unit.

Embodiment 6

The method according to any of the preceding embodiments, wherein the mobile transport unit changes its position at least once a day.

Embodiment 7

The method according to any of the preceding embodiments, wherein the mobile transport unit is an autonomous driving vehicle, and wherein processing the routing instruction comprises steering the mobile transport unit along at least a part of the determined transport route or of the changed transport route.

Embodiment 8

The method according to any of the preceding embodiments, wherein the one or more characteristics of the mobile transport unit or of a part thereof comprise one or more of a loading status, an energy status, a temperature, a humidity, a characteristic of a gas or air contained in the mobile transport unit or in a part thereof.

Embodiment 9

The method according to embodiment 8, wherein the mobile transport unit comprises a plurality of lockable compartments, and wherein the loading status is representative of the occupancy of each of the plurality of lockable compartments.

Embodiment 10

The method according to any of the preceding embodiments, wherein the one or more characteristics of the consignment pertain to one or more of a weight, a size, a form, a type, a temperature, a temperature requirement, a humidity requirement, a requirement concerning the composition of a surrounding gas or air, a susceptibility to damage, a compression requirement, a security requirement, a delivery priority, a delivery time requirement, a sender information, a recipient information.

Embodiment 11

The method according to any of the preceding embodiments, wherein the specific handling of the consignment at the mobile transport unit pertains to one or more storage conditions of the consignment at the mobile transport unit, and wherein the handling instruction is directed to controlling or affecting the one or more storage conditions.

Embodiment 12

The method according to any of the preceding embodiments, wherein the specific handling of the consignment at the mobile transport unit pertains to security, and wherein the handling instruction is directed to setting a security level under which access to the consignment is possible.

Embodiment 13

The method according to any of the preceding embodiments, wherein the routing instruction represents the determined transport route for the mobile transport unit, or a part thereof, or represents the changed transport route of the mobile transport unit, or a part thereof.

Embodiment 14

The method according to any of the preceding embodiments, wherein the transfer-related instruction is received from the routing system and allows or instructs the mobile transport unit to transfer the consignment to the other mobile transport unit.

Embodiment 15

The method according to any of the embodiments 1-13, wherein the transfer-related instruction is received from the other mobile transport unit and requests or instructs the mobile transport unit to transfer the consignment to the other mobile transport unit.

Embodiment 16

The method according to embodiment 15, wherein the other mobile transport unit provides information to the mobile transport unit enabling the mobile transport unit to check that the other mobile transport unit is entitled to receive the consignment from the mobile transport unit.

Embodiment 17

The method according to any of the preceding embodiments, where the other mobile transport unit is an airworthy mobile transport unit, for example a drone.

Embodiment 18

A computer readable storage medium storing a computer program, the computer program when executed by a processor causing an apparatus to perform and/or control the method of any of the preceding embodiments.

Embodiment 19

An apparatus or a system comprising a plurality of apparatuses, the apparatus or system configured to perform and/or control or comprising respective means for performing and/or controlling the method of any of the embodiments 1-17.

Embodiment 20

An apparatus or system, comprising at least one processor and at least one memory including computer program code, the at least one memory and the computer program code configured to, with the at least one processor, cause an apparatus or system (e.g. the apparatus or system) at least to perform or control the method according to any of the embodiments 1-17.

The invention has been described above by means of example embodiments. It should be noted that there are alternative ways and variations which are obvious to a skilled person in the art and can be implemented without deviating from the scope of the appended claims.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by a mobile transport unit, the mobile transport unit being a truck comprising at least three lockable compartments, the method comprising:
   determining, using one or more sensors of the mobile transport unit, one or more characteristics of a consignment that is to be transported or at least temporarily stored by the mobile transport unit and one or more characteristics of the mobile transport unit or of a part thereof;
   transmitting, by the mobile transport unit, the one or more characteristics of the consignment and the one or more characteristics of the mobile transport unit to a routing system to enable the routing system to determine, at least based on the one or more characteristics of the consignment and the mobile transport unit, one or more of (i) to (iii):
   (i) a transport route for the mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;
   the method further comprising receiving an instruction that is a routing instruction from the routing system, the routing instruction pertaining to the determined transport route;
   (ii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to at least one of be retrieved by recipients or be dropped off by senders or deliverers regardless of whether any consignments are actually retrieved or dropped off;
   the method further comprising receiving an instruction that is a transfer-related instruction related to a transfer of the consignment from the mobile transport unit to the other mobile transport unit;
   (iii) at least one of one or more waypoints or an associated timing of an existing transport route of the mobile transport unit or of another mobile transport unit needs to be changed to obtain a changed transport route, wherein the transport route comprises a sequence of at least two waypoints and the associated timing indicating when the at least two waypoints are reached, a predetermined dwell time at each of the at least two waypoints, and when the at least two waypoints are left, wherein the respective mobile transport unit to which the transport route pertains rests at at least two waypoints of the at least two waypoints for the predetermined dwell time to allow consignments to be retrieved by recipients and to allow consignments to be dropped off by senders or deliverers regardless of whether any consignments are actually retrieved or dropped off;
   the method further comprising receiving an instruction that is a routing instruction from the routing system, the routing instruction pertaining to the changed transport route of the mobile transport unit; and
   the method further comprising:
   processing the instruction.

2. The method according to claim 1, wherein the consignment has been dropped off at the mobile transport unit by a sender of the consignment or by a delivery entity that failed in delivering the consignment to a recipient directly.

3. The method according to claim 1, wherein at least one of a current loading status, a current position, a currently planned transport route, or other information on the mobile transport unit are provided via a communication network to assist an entity with a decision on whether to drop off a consignment at the mobile transport unit or not.

4. The method according to claim 1, wherein the routing system becomes aware of the consignment only when the consignment is dropped off at the mobile transport unit.

5. The method according to claim 1, wherein the mobile transport unit changes its position at least once a day.

6. The method according to claim 1,
   wherein the routing system is enabled to determine, at least based on the one or more characteristics of the consignment and the mobile transport unit: (iii) at least one of one or more waypoints or an associated timing of an existing transport route of the mobile transport unit or of another mobile transport unit needs to be changed to obtain a changed transport route;
   the method further comprising receiving an instruction that is a routing instruction from the routing system, the routing instruction pertaining to the changed transport route of the mobile transport unit,
   wherein the mobile transport unit is an autonomous driving vehicle, and wherein processing the routing instruction comprises steering the mobile transport unit along at least a part of the determined transport route or of the changed transport route.

7. The method according to claim 1, wherein the one or more characteristics of the mobile transport unit or of a part thereof comprise one or more of a loading status, a temperature, a humidity, a characteristic of a gas or air contained in the mobile transport unit or in a part thereof.

8. The method according to claim 7, wherein the mobile transport unit comprises a plurality of lockable compartments, and wherein the loading status is representative of the occupancy of each of the plurality of lockable compartments.

9. The method according to claim 1, wherein the one or more characteristics of the consignment pertain to one or more of a weight, a size, a form, a type, a temperature, a temperature requirement, a humidity requirement, a requirement concerning the composition of a surrounding gas or air, a susceptibility to damage, a compression requirement, a security requirement, a delivery priority, a delivery time requirement, a sender information, a recipient information.

10. The method according to claim 1,
wherein the routing system is enabled to determine, at least based on the one or more characteristics of the consignment and the mobile transport unit:
a specific handling of the consignment at the mobile transport unit; and
the method further comprising receiving an instruction that is a handling instruction from the routing system related to how the consignment shall be handled by the mobile transport unit,
wherein the specific handling of the consignment at the mobile transport unit pertains to one or more storage conditions of the consignment at the mobile transport unit, and wherein the handling instruction is directed to controlling or affecting the one or more storage conditions.

11. The method according to claim 1,
wherein the routing system is enabled to determine, at least based on the one or more characteristics of the consignment and the mobile transport unit:
a specific handling of the consignment at the mobile transport unit; and
the method further comprising receiving an instruction that is a handling instruction from the routing system related to how the consignment shall be handled by the mobile transport unit,
wherein the specific handling of the consignment at the mobile transport unit pertains to security, and wherein the handling instruction is directed to setting a security level under which access to the consignment is possible.

12. The method according to claim 1,
wherein the routing system is enabled to determine, at least based on the one or more characteristics of the consignment and the mobile transport unit: (iii) at least one of one or more waypoints or an associated timing of an existing transport route of the mobile transport unit or of another mobile transport unit needs to be changed to obtain a changed transport route;
the method further comprising receiving an instruction that is a routing instruction from the routing system, the routing instruction pertaining to the changed transport route of the mobile transport unit, wherein the routing instruction represents the determined transport route for the mobile transport unit, or a part thereof, or represents the changed transport route of the mobile transport unit, or a part thereof.

13. The method according to claim 1,
wherein the routing system is enabled to determine, at least based on the one or more characteristics of the consignment and the mobile transport unit:
(ii) a transport route for another mobile transport unit;
the method further comprising receiving an instruction that is a transfer-related instruction related to a transfer of the consignment from the mobile transport unit to the other mobile transport unit,
wherein the transfer-related instruction is received from the routing system and allows or instructs the mobile transport unit to transfer the consignment to the other mobile transport unit.

14. The method according to claim 1,
wherein the routing system is enabled to determine, at least based on the one or more characteristics of the consignment and the mobile transport unit:
(ii) a transport route for another mobile transport unit;
the method further comprising receiving an instruction that is a transfer-related instruction related to a transfer of the consignment from the mobile transport unit to the other mobile transport unit,
wherein the transfer-related instruction is received from the other mobile transport unit and requests or instructs the mobile transport unit to transfer the consignment to the other mobile transport unit.

15. The method according to claim 14, wherein the other mobile transport unit provides information to the mobile transport unit enabling the mobile transport unit to check that the other mobile transport unit is entitled to receive the consignment from the mobile transport unit.

16. The method according to claim 1,
wherein the routing system is enabled to determine, at least based on the one or more characteristics of the consignment and the mobile transport unit one or more of (ii) to (iii):
(ii) a transport route for another mobile transport unit;
the method further comprising receiving an instruction that is a transfer-related instruction related to a transfer of the consignment from the mobile transport unit to the other mobile transport unit; or
(iii) at least one of one or more waypoints or an associated timing of an existing transport route of the mobile transport unit or of another mobile transport unit needs to be changed to obtain a changed transport route;
the method further comprising receiving an instruction that is a routing instruction from the routing system, the routing instruction pertaining to the changed transport route of the mobile transport unit,
where the other mobile transport unit is an airworthy mobile transport unit.

17. A computer readable storage medium storing a computer program, the computer program when executed by a processor causing an apparatus to at least one of perform or control a method performed using a mobile transport unit, the mobile transport unit being a truck comprising at least three lockable compartments, comprising:
determining, using one or more sensors of the mobile transport unit, one or more characteristics of a consignment that is to be transported or at least temporarily stored by the mobile transport unit and one or more characteristics of the mobile transport unit or of a part thereof;
transmitting, by the mobile transport unit, the one or more characteristics of the consignment and the one or more characteristics of the mobile transport unit to a routing system to enable the routing system to determine, at least based on the one or more characteristics of the consignment and the mobile transport unit, one or more of (i) to (iii):

(i) a transport route for the mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a routing instruction from the routing system, the routing instruction pertaining to the determined transport route;

(ii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a transfer-related instruction related to a transfer of the consignment from the mobile transport unit to the other mobile transport unit;

(iii) at least one of one or more waypoints or an associated timing of an existing transport route of the mobile transport unit or of another mobile transport unit needs to be changed to obtain a changed transport route, wherein the transport route comprises a sequence of at least two waypoints and the associated timing indicating when the at least two waypoints are reached, a predetermined dwell time at each of the at least two waypoints, and when the at least two waypoints are left, wherein the respective mobile transport unit to which the transport route pertains rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a routing instruction from the routing system, the routing instruction pertaining to the changed transport route of the mobile transport unit; and the method further comprising:
processing the instruction.

18. An apparatus or system comprising at least one processor and at least one memory including computer program code, the at least one memory and the computer program code configured to, with the at least one processor, cause an apparatus or system at least to perform or control a method performed using a mobile transport unit, the mobile transport unit being a truck comprising at least three lockable compartments, comprising:

determining, using one or more sensors of the mobile transport unit, one or more characteristics of a consignment that is to be transported or at least temporarily stored by the mobile transport unit and one or more characteristics of the mobile transport unit or of a part thereof;

transmitting, by the mobile transport unit, the one or more characteristics of the consignment and the one or more characteristics of the mobile transport unit to a routing system to enable the routing system to determine, at least based on the one or more characteristics of the consignment and the mobile transport unit, one or more of (i) to (iii):

(i) a transport route for the mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a routing instruction from the routing system, the routing instruction pertaining to the determined transport route;

(ii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a transfer-related instruction related to a transfer of the consignment from the mobile transport unit to the other mobile transport unit;

(iii) at least one of one or more waypoints or an associated timing of an existing transport route of the mobile transport unit or of another mobile transport unit needs to be changed to obtain a changed transport route, wherein the transport route comprises a sequence of at least two waypoints and the associated timing indicating when the at least two waypoints are reached, a predetermined dwell time at each of the at least two waypoints, and when the at least two waypoints are left, wherein the respective mobile transport unit to which the transport route pertains rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising receiving an instruction that is a routing instruction from the routing system, the routing instruction pertaining to the changed transport route of the mobile transport unit; and the method further comprising:
processing the instruction.

19. The apparatus according to claim 18, wherein the consignment has been dropped off at the mobile transport unit by a sender of the consignment or by a delivery entity that failed in delivering the consignment to a recipient directly.

20. The apparatus according to claim 18, wherein at least one of a current loading status, a current position, a currently planned transport route, or other information on the mobile transport unit are provided via a communication network to assist an entity with a decision on whether to drop off a consignment at the mobile transport unit or not.

21. The apparatus according to claim 18, wherein the routing system becomes aware of the consignment only when the consignment is dropped off at the mobile transport unit.

22. The apparatus according to claim 18, wherein the mobile transport unit changes its position at least once a day.

23. The apparatus according to claim 18, wherein the one or more characteristics of the mobile transport unit or of a part thereof comprise one or more of a loading status, a temperature, a humidity, a characteristic of a gas or air contained in the mobile transport unit or in a part thereof.

24. The apparatus according to claim 23, wherein the mobile transport unit comprises a plurality of lockable compartments, and wherein the loading status is representative of the occupancy of each of the plurality of lockable compartments.

25. The apparatus according to claim 18, wherein the one or more characteristics of the consignment pertain to one or more of a weight, a size, a form, a type, a temperature, a temperature requirement, a humidity requirement, a requirement concerning the composition of a surrounding gas or air, a susceptibility to damage, a compression requirement, a security requirement, a delivery priority, a delivery time requirement, a sender information, a recipient information.

26. The apparatus according to claim 18,
wherein the routing system is enabled to determine, at least based on the one or more characteristics of the consignment and the mobile transport unit:
a specific handling of the consignment at the mobile transport unit; and
the method further comprising receiving an instruction that is a handling instruction from the routing system related to how the consignment shall be handled by the mobile transport unit,
wherein the specific handling of the consignment at the mobile transport unit pertains to one or more storage conditions of the consignment at the mobile transport unit, and wherein the handling instruction is directed to controlling or affecting the one or more storage conditions.

27. The apparatus according to claim 18,
wherein the routing system is enabled to determine, at least based on the one or more characteristics of the consignment and the mobile transport unit:
a specific handling of the consignment at the mobile transport unit; and
the method further comprising receiving an instruction that is a handling instruction from the routing system related to how the consignment shall be handled by the mobile transport unit,
wherein the specific handling of the consignment at the mobile transport unit pertains to security, and wherein the handling instruction is directed to setting a security level under which access to the consignment is possible.

28. The apparatus according to claim 18,
wherein the routing system is enabled to determine, at least based on the one or more characteristics of the consignment and the mobile transport unit: (iii) at least one of one or more waypoints or an associated timing of an existing transport route of the mobile transport unit or of another mobile transport unit needs to be changed to obtain a changed transport route;
the method further comprising receiving an instruction that is a routing instruction from the routing system, the routing instruction pertaining to the changed transport route of the mobile transport unit, wherein the routing instruction represents the determined transport route for the mobile transport unit, or a part thereof, or represents the changed transport route of the mobile transport unit, or a part thereof.

29. The apparatus according to claim 18,
wherein the routing system is enabled to determine, at least based on the one or more characteristics of the consignment and the mobile transport unit:
(ii) a transport route for another mobile transport unit;
the method further comprising receiving an instruction that is a transfer-related instruction related to a transfer of the consignment from the mobile transport unit to the other mobile transport unit,
wherein the transfer-related instruction is received from the routing system and allows or instructs the mobile transport unit to transfer the consignment to the other mobile transport unit.

30. The apparatus according to claim 18,
wherein the routing system is enabled to determine, at least based on the one or more characteristics of the consignment and the mobile transport unit:
(ii) a transport route for another mobile transport unit;
the method further comprising receiving an instruction that is a transfer-related instruction related to a transfer of the consignment from the mobile transport unit to the other mobile transport unit,
wherein the transfer-related instruction is received from the other mobile transport unit and requests or instructs the mobile transport unit to transfer the consignment to the other mobile transport unit.

31. The apparatus according to claim 18,
wherein the routing system is enabled to determine, at least based on the one or more characteristics of the consignment and the mobile transport unit one or more of (ii) to (iii):
(ii) a transport route for another mobile transport unit;
the method further comprising receiving an instruction that is a transfer-related instruction related to a transfer of the consignment from the mobile transport unit to the other mobile transport unit; or
(iii) at least one of one or more waypoints or an associated timing of an existing transport route of the mobile transport unit or of another mobile transport unit needs to be changed to obtain a changed transport route;
the method further comprising receiving an instruction that is a routing instruction from the routing system, the routing instruction pertaining to the changed transport route of the mobile transport unit,
where the other mobile transport unit is an airworthy mobile transport unit.

32. A method performed by a routing system, the method comprising:

receiving one or more characteristics of a consignment that is to be transported or at least temporarily stored by a mobile transport unit, the mobile transport unit being a truck comprising at least three lockable compartments, and one or more characteristics of the mobile transport unit or of a part thereof, wherein the one or more characteristics of the consignment and the one or more characteristics of the mobile transport unit or of a part thereof are determined using one or more sensors of the mobile transport unit;

determining, at least based on the one or more characteristics of the consignment and the mobile transport unit, one or more of (i) to (iv):

(i) a transport route for the mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the mobile transport unit and pertains to the determined transport route for the mobile transport unit;

(ii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the other mobile transport unit and pertains to the determined transport route of the other mobile transport unit;

(iii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a transfer-related instruction, which is transmitted to the mobile transport unit and relates to a transfer of the consignment from the mobile transport unit to the other mobile transport unit; and (iv) at least one of one or more waypoints or an associated timing of an existing transport route of the mobile transport unit or of another mobile transport unit need to be changed to obtain a changed transport route, wherein the transport route comprises a sequence of at least two waypoints and the associated timing indicating when the at least two waypoints are reached, a predetermined dwell time at each of the at least two waypoints, and when the at least two waypoints are left, wherein the respective mobile transport unit to which the transport route pertains rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the mobile transport unit and pertains to the changed transport route of the mobile transport unit.

33. An apparatus or system comprising at least one processor and at least one memory including computer program code, the at least one memory and the computer program code configured to, with the at least one processor, cause an apparatus or system at least to perform or control a method performed by a routing system, the method comprising:

receiving one or more characteristics of a consignment that is to be transported or at least temporarily stored by a mobile transport unit, the mobile transport unit being a truck comprising at least three lockable compartments, and one or more characteristics of the mobile transport unit or of a part thereof, wherein the one or more characteristics of the consignment and the one or more characteristics of the mobile transport unit or of a part thereof are determined using one or more sensors of the mobile transport unit;

determining, at least based on the one or more characteristics of the consignment and the mobile transport unit, one or more of (i) to (iv):

(i) a transport route for the mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the mobile transport unit and pertains to the determined transport route for the mobile transport unit;

(ii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the other mobile transport unit and pertains to the determined transport route of the other mobile transport unit (iii) a transport route for another mobile transport unit, wherein the transport route comprises a sequence of at least two waypoints and an associated timing indicating when the at least two waypoints are reached, a predetermined dwell time at each of the at least two waypoints, and when the at least two waypoints are left, wherein the other mobile transport unit rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a transfer-related instruction, which is transmitted to the mobile transport unit and relates to a transfer of the consignment from the mobile transport unit to the other mobile transport unit; and (iv) at least one of one or more waypoints or an associated timing of an existing transport route of the mobile transport unit or of another mobile transport unit need to be changed to obtain a changed transport route, wherein the transport route comprises a sequence of at least two waypoints and the associated timing indicating when the at least two waypoints are reached, a predetermined dwell time at each of the at least two waypoints, and when the at least two waypoints are left, wherein the respective mobile transport unit to which the transport route pertains rests at at least two waypoints of the at least two waypoints for the predetermined dwell time to allow consignments to be retrieved by recipients and to allow consignments to be dropped off by senders or deliverers regardless of whether any consignments are actually retrieved or dropped off;

the method further comprising transmitting an instruction that is a routing instruction, which is transmitted to the mobile transport unit and pertains to the changed transport route of the mobile transport unit.

34. The apparatus according to claim 33, wherein the consignment has been dropped off at the mobile transport unit by a sender of the consignment or by a delivery entity that failed in delivering the consignment to a recipient directly.

35. The apparatus according to claim 33, wherein at least one of a current loading status, a current position, a currently planned transport route, or other information on the mobile transport unit are provided via a communication network to assist an entity with a decision on whether to drop off a consignment at the mobile transport unit or not.

36. The apparatus according to claim 33, wherein the routing system becomes aware of the consignment only when the consignment is dropped off at the mobile transport unit.

37. The apparatus according to claim 33, wherein the mobile transport unit changes its position at least once a day.

38. The apparatus according to claim 33, wherein the one or more characteristics of the mobile transport unit or of a part thereof comprise one or more of a loading status, a temperature, a humidity, a characteristic of a gas or air contained in the mobile transport unit or in a part thereof.

39. The apparatus according to claim 38, wherein the mobile transport unit comprises a plurality of lockable compartments, and wherein the loading status is representative of the occupancy of each of the plurality of lockable compartments.

40. The apparatus according to claim 33, wherein the one or more characteristics of the consignment pertain to one or more of a weight, a size, a form, a type, a temperature, a temperature requirement, a humidity requirement, a requirement concerning the composition of a surrounding gas or air, a susceptibility to damage, a compression requirement, a security requirement, a delivery priority, a delivery time requirement, a sender information, a recipient information.

41. The apparatus according to claim 33,
wherein the method comprises determining, at least based on the one or more characteristics of the consignment and the mobile transport unit:
a specific handling of the consignment at the mobile transport unit; and
the method further comprising transmitting an instruction that is a handling instruction, which is transmitted to the mobile transport unit and related to how the consignment shall be handled by the mobile transport unit,
wherein the specific handling of the consignment at the mobile transport unit pertains to one or more storage conditions of the consignment at the mobile transport unit, and wherein the handling instruction is directed to controlling or affecting the one or more storage conditions.

42. The apparatus according to claim 33,
wherein the method comprises determining, at least based on the one or more characteristics of the consignment and the mobile transport unit:
a specific handling of the consignment at the mobile transport unit; and
the method further comprising transmitting an instruction that is a handling instruction, which is transmitted to the mobile transport unit and related to how the consignment shall be handled by the mobile transport unit,
wherein the specific handling of the consignment at the mobile transport unit pertains to security, and wherein the handling instruction is directed to setting a security level under which access to the consignment is possible.

43. The apparatus according to claim 33,
wherein the method comprises determining, at least based on the one or more characteristics of the consignment and the mobile transport unit: (iv) at least one of one or more waypoints or an associated timing of an existing transport route of the mobile transport unit or of another mobile transport unit needs to be changed to obtain a changed transport route;
the method further comprising transmitting an instruction that is a routing instruction, which is transmitted to the mobile transport unit and pertains to the changed transport route of the mobile transport unit, wherein the routing instruction represents the determined transport route for the mobile transport unit, or a part thereof, or represents the changed transport route of the mobile transport unit, or a part thereof.

44. The apparatus according to claim 33,
wherein the method comprises determining, at least based on the one or more characteristics of the consignment and the mobile transport unit:
(iii) a transport route for another mobile transport unit;
the method further comprising transmitting an instruction that is a transfer-related instruction, which is transmitted to the mobile transport unit and relates to a transfer of the consignment from the mobile transport unit to the other mobile transport unit, wherein the transfer-related instruction allows or instructs the mobile transport unit to transfer the consignment to the other mobile transport unit.

45. The apparatus according to claim 33,
wherein the method comprises determining, at least based on the one or more characteristics of the consignment and the mobile transport unit one or more of (iii) to (iv):
(iii) a transport route for another mobile transport unit;
the method further comprising transmitting an instruction that is a transfer-related instruction, which is transmitted to the mobile transport unit and relates to a transfer of the consignment from the mobile transport unit to the other mobile transport unit; or
(iv) at least one of one or more waypoints or an associated timing of an existing transport route of the mobile transport unit or of another mobile transport unit need to be changed to obtain a changed transport route;
the method further comprising transmitting an instruction that is a routing instruction, which is transmitted to the mobile transport unit and pertains to the changed transport route of the mobile transport unit,
where the other mobile transport unit is an airworthy mobile transport unit.

* * * * *